United States Patent
Baldwin et al.

[11] Patent Number: 6,131,392
[45] Date of Patent: Oct. 17, 2000

[54] AIR PIPE FOR USE WITH A TURBOCHARGER IN AN INTERNAL COMBUSTION ENGINE

[75] Inventors: Darryl D. Baldwin, Lacon, Ill.; Rodney M. Shurman, Lafayette, Ind.

[73] Assignee: Caterpillar Inc., Peoria, Ill.

[21] Appl. No.: 09/267,550

[22] Filed: Mar. 12, 1999

[51] Int. Cl.[7] .................................................. F02B 29/04
[52] U.S. Cl. .......................... 60/599; 285/302; 60/605.1
[58] Field of Search .................... 60/599, 605.1; 123/563; 285/302

[56] References Cited

U.S. PATENT DOCUMENTS

| 3,576,335 | 4/1971 | Kowal et al. | 285/302 |
| 4,559,783 | 12/1985 | Ampferer | 60/605.1 |
| 4,981,311 | 1/1991 | Kinney | 285/302 |

OTHER PUBLICATIONS

European Patent Application 0266098 Apr. 1988.

*Primary Examiner*—Noah P. Kamen
*Attorney, Agent, or Firm*—Taylor & Aust, P.C.

[57] ABSTRACT

An internal combustion engine includes at least one combustion cylinder and a turbocharger with a compressor for a combustion fluid which is introduced into the combustion cylinder. The compressor has a discharge outlet. An air duct is connected with the combustion cylinder for providing the combustion fluid to the combustion cylinder. The air duct has an inlet opening. An air pipe interconnects the compressor with the air duct. The air pipe has a first end connected with the discharge outlet of the compressor and a second end connected with the inlet opening of the air duct. The second end includes an outwardly projecting shoulder. A flange disposed around the second end of the air pipe includes a recess capturing the shoulder therein and an axial face attached directly with the air duct.

12 Claims, 3 Drawing Sheets

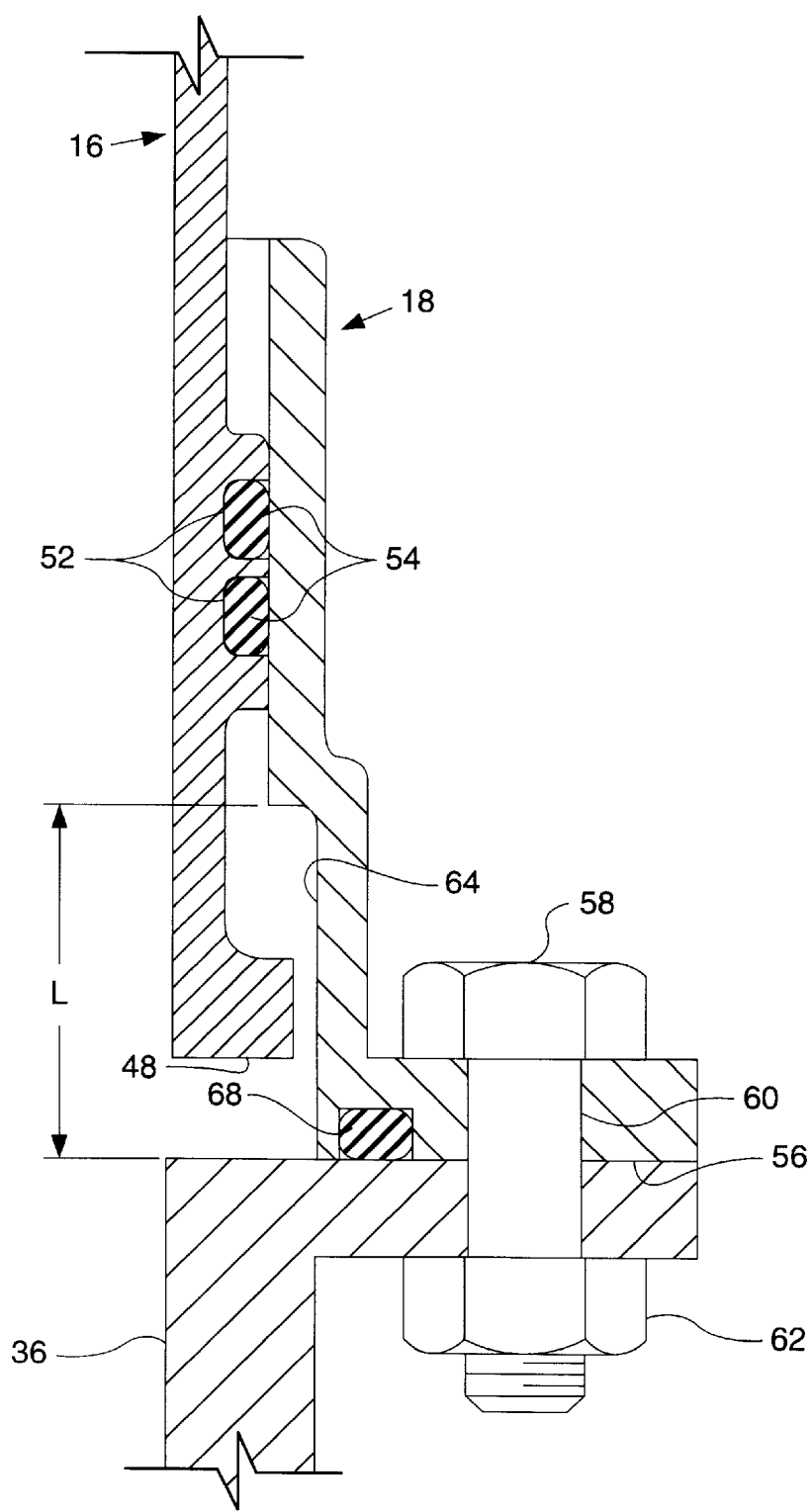

Fig-3-
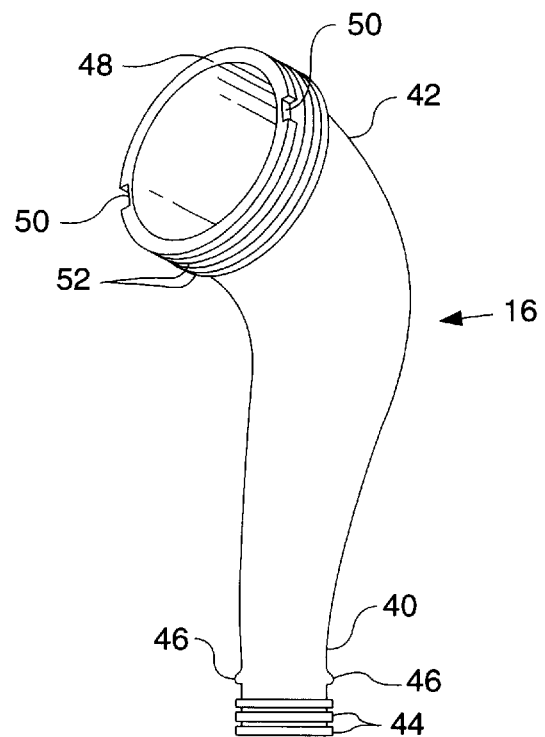
Fig-4-
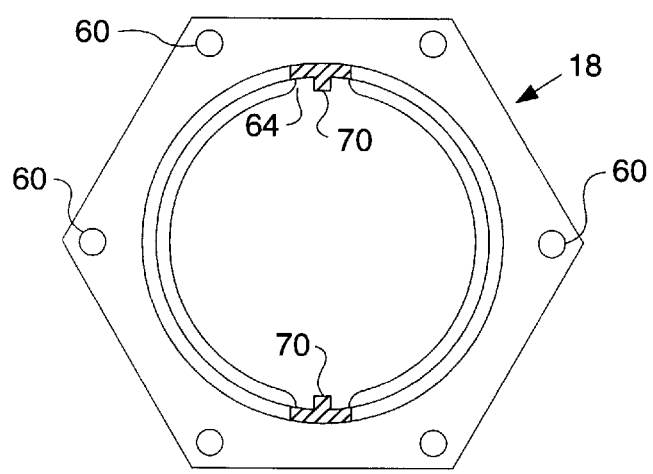

AIR PIPE FOR USE WITH A TURBOCHARGER IN AN INTERNAL COMBUSTION ENGINE

TECHNICAL FIELD

The present invention relates to internal combustion engines, and, more particularly, to air pipes and air ducts connected with a turbocharger in an internal combustion engine.

BACKGROUND ART

An internal combustion engine may include one or more turbochargers for compressing a fluid which is supplied to one or more combustion chambers within corresponding combustion cylinders. Each turbocharger typically includes a turbine driven by exhaust gasses of the engine and a compressor which is driven by the turbine. The compressor receives the fluid to be compressed and supplies the fluid to the combustion chamber. The fluid which is compressed by the compressor may be in the form of combustion air or a fuel and air mixture.

It is known to use an air pipe to connect a discharge outlet of a compressor with further air ducting leading to each combustion cylinder. The further air ducting may be in the form of an aftercooler. The end of the air pipe which is attached to the aftercooler typically slides into a socket at the inlet opening to the aftercooler. A bracket in the form of an ear which extends radially from the outside of the air pipe is connected to the aftercooler using bolts, etc. To supply the compressed fuel and air mixture to the aftercooler, it is typically necessary that the air pipe be curved in a horn-shaped fashion. During use, the curve in the air pipe causes the pressurized fuel and air mixture therein to exert a substantial axial load on the air pipe at the end attached to the aftercooler. The axial load is large enough that sometimes the radially extending bracket on the air pipe bends or breaks, thereby allowing the end of the air pipe to fully or partially disengage from the aftercooler. This may result in some of the fuel and air mixture escaping to the ambient environment, which is not desirable.

The present invention is directed to overcoming one or more of the problems as set forth above.

DISCLOSURE OF THE INVENTION

In one aspect of the invention, an internal combustion engine includes at least one combustion cylinder and a turbocharger with a compressor for a combustion fluid which is introduced into the combustion cylinder. The compressor has a discharge outlet. An air duct is connected with the combustion cylinder for providing the combustion fluid to the combustion cylinder. The air duct has an inlet opening. An air pipe interconnects the compressor with the air duct. The air pipe has a first end connected with the discharge outlet of the compressor and a second end connected with the inlet opening of the air duct. The second end includes an outwardly projecting shoulder. A flange disposed around the second end of the air pipe includes a recess capturing the shoulder therein and an axial face attached directly with the air duct.

In another aspect of the invention, an internal combustion engine includes at least one combustion cylinder and a turbocharger with a compressor for a combustion fluid which is introduced into the combustion cylinder. The compressor has a discharge outlet. An aftercooler for cooling the combustion fluid has an inlet opening. An air pipe interconnects the compressor with the aftercooler. The air pipe has a first end connected with the discharge outlet of the compressor and a second end connected with the inlet opening of the aftercooler. The second end includes an outwardly projecting shoulder having at least one notch therein. A flange disposed around the second end of the air pipe includes a recess capturing the shoulder therein and an axial face attached directly with the aftercooler. The recess includes at least one projection, with each projection being received within a corresponding notch. The at least one notch and the at least one projection prevent rotation of the air pipe relative to the inlet opening.

BRIEF DESCRIPTION OF THE DRAWINGS

FIG. 2 is a sectional view taken along line 2—2 in FIG. 1;

FIG. 3 is a perspective view of the air pipe shown in FIGS. 1 and 2; and

FIG. 4 is a top view of the flange shown in FIGS. 1 and 2.

BEST MODE FOR CARRYING OUT THE INVENTION

Figure 1:
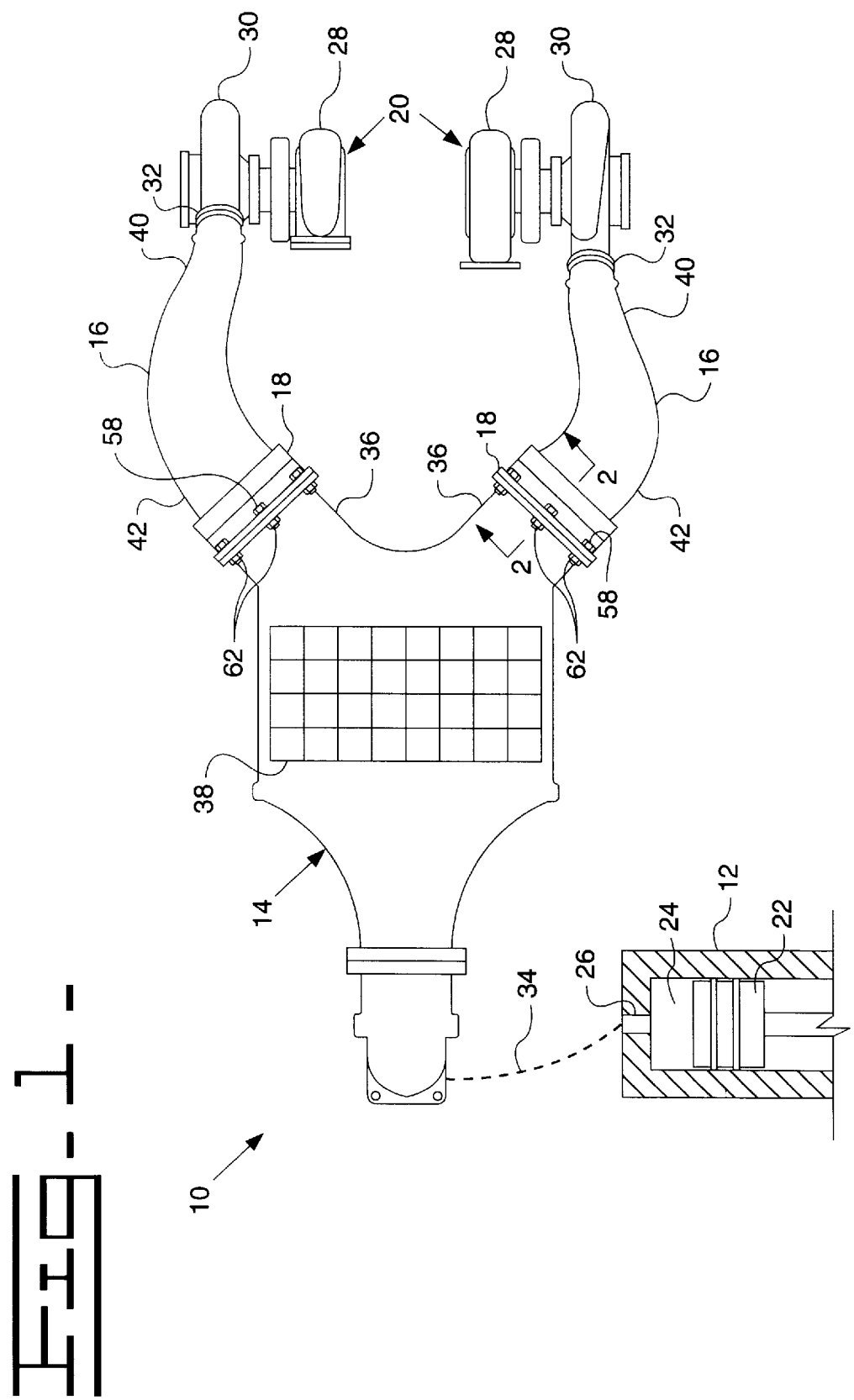
FIG. 1 is a top view of a portion of an internal combustion engine, including an embodiment of an air pipe of the present invention.

Referring now to the drawings, and particularly to FIG. 1, there is shown a portion of an internal combustion engine 10, including a combustion cylinder 12, air duct 14, air pipes 16, flanges 18 and turbochargers 20.

For ease of illustration, only a single combustion cylinder 12 is shown in FIG. 1. However, internal combustion engine 10 typically includes a plurality of combustion cylinders 12. Each combustion cylinder 12 includes a piston 22 reciprocally disposed therein. A combustion fluid such as an air and fuel mixture is introduced into a combustion chamber 24 within combustion cylinder 12 through a port 26.

Each turbocharger 20 includes a turbine 28 and a compressor 30. Turbine 28 is driven by exhaust gasses from internal combustion engine 10 and includes an output shaft which in turn drives compressor 30. Compressor 30 receives combustion air from the ambient environment and supplies pressurized combustion air to combustion chamber 24 within combustion cylinder 12. In the embodiment shown, the combustion air is mixed with fuel (natural gas) before entering compressor 30 such that compressor 30 pressurizes an air and fuel mixture which is supplied to combustion chamber 24 within combustion cylinder 12. The structure and method used to mix the air and fuel which is introduced into compressor 30 is known and therefore not described in further detail herein. Each compressor 30 includes a discharge outlet 32 from which the pressurized air and fuel mixture is discharged.

Air duct 14 is connected with combustion cylinder 12 (indicated schematically by dashed line 34) and provides the pressurized air and fuel mixture received from compressor 30 to combustion chamber 24 of combustion cylinder 12. Air duct 14 may have any suitable geometric configuration, dependent upon the particular internal combustion engine with which it is used. Air duct 14 includes two inlet openings 36 which are respectively connected with each compressor 30, and which receive the pressurized air and fuel mixture from compressor 30. Air duct 14 also includes an aftercooler 38 which cools the pressurized air and fuel mixture received from compressors 30 so that a cooled air and fuel mixture is supplied to combustion chamber 24 of combustion cylinder 12. Aftercooler 38 may have any suitable configuration, but generally is in the form of a heat exchanger for cooling the air and fuel mixture.

Each air pipe 16 interconnects a corresponding discharge outlet 32 of a compressor 30 with an inlet opening 36 of air duct 14. More particularly, each air pipe 16 includes a first end 40 (FIGS. 1 and 3) connected with discharge outlet 32 and a second end 42 connected with inlet opening 36. First end 40 includes a pair of annular grooves 44 in the periphery thereof which receive corresponding seals (not shown) for sealing between first end 40 and discharge outlet 32. A pair of ears 46 limit the degree to which first end 40 may be slid into a corresponding discharge outlet 32.

Second end 42 includes an outwardly projecting shoulder 48. In the embodiment shown, second end 42 has a substantially circular cross-section, and shoulder 48 extends radially outwardly. Shoulder 48 includes a pair of notches 50 therein which prevent unlimited rotation of air pipe 16 relative to a corresponding inlet opening 36, as will be described in more detail hereinafter. Second end 42 also includes a pair of annular grooves 52 around the periphery thereof. Each annular groove 52 receives a corresponding seal 54 therein.

Flanges 18 (FIGS. 1 and 4) are disposed around respective second ends 42 of air pipes 16. Each flange 18 includes an axial face 56 which is attached with air duct 14. Axial face 56 may include an annular groove 66 accommodating a seal 68 for sealing between axial face 56 and air duct 14. Of course, a gasket (not shown) may also be provided between axial face 56 and air duct 14 to ensure a fluid tight seal. A plurality of bolts 58 extend through corresponding bolt holes 60 in flange 18 and interconnect flange 18 with air duct 14. Nuts 62 are threadingly engaged with corresponding bolts 58 for attaching flange 18 with air duct 14.

Flange 18 also includes a recess 64 around the inside diameter thereof adjacent air duct 14. Recess 64 has an axial length L which is greater than the axial length of shoulder 48. Recess 64 is thereby configured to allow limited axial movement of shoulder 48 therein. Such axial movement accommodates assembly tolerances, and also accommodates axial movement during use caused by loading associated with the pressurized fluid and thermal expansion and contraction.

Each flange 18 also includes a pair of projections 70 which project into recess 64. Projections 70 are sized and configured to be received within corresponding notches 50 in shoulder 48 of air pipe 16. Since each flange 18 is rigidly attached to air duct 14, and projections 70 are received within notches 50, projections 70 and notches 50 prevent rotation of each respective air pipe 16 relative to inlet opening 36 of air duct 14. Other types of keying arrangements between flange 18 and air pipe 16 may also be used to prevent rotation of air pipe 16 during use.

INDUSTRIAL APPLICABILITY

To assemble each air pipe 16, flange 18 is slid over first end 40 to second end 42. First end 40 is then slid into discharge outlet 32. The extent to which first end 40 is slid into discharge outlet 32 is limited by ears 46, and the interconnection is sealed by the seals disposed within annular grooves 44. Flange 18 is then rotated against shoulder 48 of second end 42 until projections 70 are received within notches 50. Bolts 58 and nuts 62 are used to attach flange 18 with inlet opening 36 of air duct 14. Seal 68 at axial face 56 seals between flange 18 and air duct 14. Moreover, seals 54 in annular grooves 52 seal between flange 18 and second end 42 of air pipe 16. Manufacturing tolerances are accommodated by the oversized axial length L of recess 64 in flange 18.

During use, pressurized air and fuel mixture is discharged from discharge outlet 32 into pipe 16. The curved shape of each air pipe 16 causes axial forces to be exerted against air pipe 16 by the pressurized fluid flowing into aftercooler 38. These axial forces can be rather large and bias air pipe 16 away from inlet opening 36 of air duct 14. Additionally, the air and fuel mixture is heated because of the work performed by compressor 30. The oversized axial length L of recess 64 also accommodates such axial loading and thermal expansion and contraction during use.

In the event that shoulder 48 of air pipe 16 contacts flange 18 and/or thermally expands and contracts during use, the increased surface area for loading provided by shoulder 48 effectively retains air pipe 16 within flange 18 and prevents leakage of the pressurized air and fuel mixture to the ambient environment. That is, the increased surface area provided by shoulder 48 which extends around most of the periphery of second end 42 better distributes the axial load and retains air pipe 16 within flange 18. Additionally, the keying arrangement in the form of projections 70 and recesses 64 prevent unlimited rotation of air pipe 16 relative to inlet opening 36 of air duct 14.

Other aspects, objects and advantages of this invention can be obtained from a study of the drawings, the disclosure and the appended claims.

What is claimed is:

1. An internal combustion engine, comprising:
   at least one combustion cylinder;
   a turbocharger including a compressor for a combustion fluid, said compressor having a discharge outlet;
   an air duct connected with said combustion cylinder for providing the combustion fluid to said combustion cylinder, said air duct having an inlet opening;
   an air pipe interconnecting said compressor with said air duct, said air pipe having a first end connected with said discharge outlet of said compressor and a second end connected with said inlet opening of said air duct, said second end including an outwardly projecting shoulder, said shoulder in said air pipe including at least one notch therein; and
   a flange around said second end of said air pipe, said flange attached to said air duct and including a recess capturing said shoulder therein, said recess in said flange including at least one projection, each said projection being received within a corresponding said notch, said at least one notch and said at least one projection preventing rotation of said air pipe relative to said inlet opening.

2. The internal combustion engine of claim 1, wherein said air duct comprises an aftercooler.

3. The internal combustion engine of claim 1, wherein said second end of said air pipe includes at least one annular groove around a periphery thereof adjacent to said flange, and further comprising at least one seal, each said seal disposed in a respective said groove.

4. The internal combustion engine of claim 1, wherein said at least one annular groove comprises two annular grooves, and wherein said at least one seal comprises two seals.

5. The internal combustion engine of claim 1, wherein said recess in said flange is configured to allow limited axial movement of said shoulder therein.

6. The internal combustion engine of claim 1, wherein said second end of said air pipe has a circular cross section.

7. The internal combustion engine of claim 1, wherein said combustion fluid comprises an air and fuel mixture.

8. The internal combustion engine of claim 7, wherein said fuel comprises natural gas.

9. An internal combustion engine, comprising:

at least one combustion cylinder;

a turbocharger including a compressor for a combustion fluid, said compressor having a discharge outlet;

an aftercooler for cooling the combustion fluid, said aftercooler having an inlet opening;

an air pipe interconnecting said compressor with said aftercooler, said air pipe having a first end connected with said discharge outlet of said compressor and a second end connected with said inlet opening of said aftercooler, said second end including an outwardly projecting shoulder having at least one notch therein; and a flange around said second end of said air pipe, said flange including a recess capturing said shoulder therein and an axial face attached with said aftercooler, said recess including at least one projection, each said projection received within a corresponding said notch, said at least one notch and said at least one projection preventing rotation of said air pipe relative to said inlet opening.

10. The internal combustion engine of claim 9, wherein said second end of said air pipe includes at least one annular groove around a periphery thereof adjacent to said flange, and further comprising at least one seal, each said seal disposed in a respective said groove.

11. The internal combustion engine of claim 9, wherein said at least one annular groove comprises two annular grooves, and wherein said at least one seal comprises two seals.

12. An internal combustion engine, comprising:

at least one combustion cylinder;

a turbocharger including a compressor for a combustion fluid, said compressor having a discharge outlet;

an air duct connected with said combustion cylinder for providing the combustion fluid to said combustion cylinder, said air duct having an inlet opening;

an air pipe interconnecting said compressor with said air duct, said air pipe having a first end connected with said discharge outlet of said compressor and a second end connected with said inlet opening of said air duct, said second end including an outwardly projecting shoulder and having at least one annular groove around a periphery thereof and adjacent to said shoulder, each said groove being located between said shoulder and said first end, each said groove having a seal disposed therein; and a flange around said shoulder and each said groove at said second end of said air pipe, said flange attached to said air duct and including a recess capturing said shoulder therein.

\* \* \* \* \*